United States Patent [19]

Serbent et al.

[11] 4,312,666
[45] Jan. 26, 1982

[54] STEEL MAKING PROCESS

[75] Inventors: Harry Serbent, Hanau; Gerhard Reuter, Frankfurt; Wolfram Schnabel, Hattersheim; Heinz Eichberger, Bad Soden, all of Fed. Rep. of Germany

[73] Assignee: Metallgesellschaft AG, Frankfurt, Fed. Rep. of Germany

[21] Appl. No.: 119,288

[22] Filed: Feb. 7, 1980

[30] Foreign Application Priority Data

Feb. 13, 1979 [DE] Fed. Rep. of Germany ....... 2905339

[51] Int. Cl.$^3$ ............................................. C21B 13/12
[52] U.S. Cl. ......................................... 75/11; 75/25; 75/77; 75/88
[58] Field of Search ......................... 75/11, 25, 88, 77

[56] References Cited

U.S. PATENT DOCUMENTS

| | | | |
|---|---|---|---|
| 4,209,322 | 6/1980 | Janssen et al. | 75/25 |
| 4,213,778 | 7/1980 | Sitz | 75/25 |

*Primary Examiner*—M. J. Andrews
*Attorney, Agent, or Firm*—Sprung, Felfe, Horn, Lynch & Kramer

[57] ABSTRACT

Residual materials which become available in metallurgy and contain oxides and volatilizable non-ferrous metals or compounds thereof are treated in a rotary kiln with solid carbonaceous reducing agents and are thus directly reduced in a high proportion to sponge iron whereas a substantial part of their non-ferrous metal content is volatilized. The solids discharged from the rotary kiln are sieved with a parting size of about 3 to 10 mm, depending on the feed grading of the residual materials and their disintegration characteristics, so that a major part of the unmagnetic material is included in the fine fraction. The coarse fraction is subjected to an electro-slag resistance process. The fine fraction is subjected to an electro-magnetic separation. The magnetic fraction is subjected to the resistance slag-refining process. The unmagnetic fraction is incorporated in and bonded to the feed mixture for the rotary kiln by a tumbling or pelletizing operation.

6 Claims, No Drawings

STEEL MAKING PROCESS

BACKGROUND OF THE INVENTION

1. Field of the Invention

This invention relates to a steelmaking process in which materials containing iron oxide are directly reduced and the sponge iron is melted by electro-slag resistance process.

2. Discussion of the Prior Art

Residual materials which become available in metallurgy, such as blast furnace dusts, Linz-Donawitz (LD) process dusts and Linz-Donawitz process muds, contain non-ferrous metals or compounds thereof in considerable quantities and for this reason cannot be recharged to the blast furnace or used for steelmaking unless their non-ferrous metal content has been substantially removed.

The non-ferrous metals and their compounds can be removed in a rotary kiln by a reducing treatment with solid carbonaceous reducing agents. As a result of such treatment, the volatilizable non-ferrous metals or their compounds are withdrawn from the rotary kiln in the exhaust gas thereof and can then be separated from said exhaust gases and recovered. The iron oxides are reduced to sponge iron, which is included in the solids discharged from the rotary kiln. Because the non-ferrous metal content of the residual materials virtually always includes Zn or compounds thereof and the volatilization of such Zn content to a high degree and a metallization of substantially all of the iron oxide depends on a surplus of solid carbonaceous material in the rotary kiln, the solids discharged from the rotary kiln contain surplus carbon.

It is also known to use the electro-slag resistance slag-refining process for melting sponge iron and for transforming it to steel ("Stahl und Eisen" 97 (1977), pages 12 to 17). The sponge iron subjected to that known process had been produced by a reduction process in which a gas rather than a solid carbonaceous material is used as a reducing agent. The charging of sponge iron having a high content of surplus carbon, such as is obtained by the direct reduction or the waelz process carried out in a rotary kiln by means of solid carbonaceous reducing agents, would be disturbing because more carbon is present than is required for the final reduction and the surplus varies greatly. Whereas the surplus carbon can be separated from the sponge iron by sieving and magnetic separation and can be separated from the coal ash by flotation or electrostatic separation and be subsequently recycled to the rotary kiln, coal ash becomes available as a residual material in that practice is so fine-grained that it cannot readily be sold. The coal ash also contains certain quantities of carbon and iron, which are lost.

It is the object of the invention to provide for an economical and simple treatment of sponge-iron of sponge-iron containing material discharged from a direct reduction or waelz process carried out in a rotary kiln in which metallurgical residual materials containing iron oxides and volatilizable non-ferrous metals or compounds thereof are treated by means of solid carbonaceous reducing agents—in the electro-slag resistance process.

SUMMARY OF THE INVENTION

This object is accomplished according to the invention by a process wherein (a) Metallurgical residual materials which contain oxides and volatilizable non-ferrous metals or compounds thereof are treated in a rotary kiln with solid carbonaceous reducing agents and are thus reduced in a high proportion to sponge iron whereas a substantial part of their non-ferrous metal content is volatilized;

(b) the solids discharged from the rotary kiln are sieved with a parting size of about 3 to 10 mm, depending on the feed grading of the residual materials and their disintegration characteristics, so that a major part of the unmagnetic material is included in the fine fraction;

(c) the coarse fraction is subjected to the electro-slag resistance process;

(d) the fine fraction is subjected to an electromagnetic separation;

(e) the magnetic fraction is subjected to the electro-slag resistance process, and (f) the unmagnetic fraction is incorporated in and bonded to the feed mixture for the rotary kiln by a rolling or pelletizing operation.

In one embodiment, the unmagnetic fraction is ground before it is incorporated in and bonded to the feed mixture. This grinding operation is adopted if a bonding of substantially all of the unmagnetic fraction to the feed mixture is not possible otherwise.

In a preferred embodiment, the sieving step (b) is carried out at an elevated temperature and the fine fraction is cooled to a temperature below 750° C. before the separating step (d). This will save cooling costs and will result in a utilization of part of the heat content of the feed in the electro-slag resistance process.

According to a preferred further feature, step (b) is carried out to include more than 80 percent of the unmagnetic material in the fine fraction. This practice gives particularly good results in the overall process.

The advantages afforded by the invention reside in that the material discharged from the rotary kiln is subjected to a special treatment, which is technologically and economically simple and enables the material to be treated by the electro-slag resistance process in such a manner that additional residual material is not formed. As a result of the bonding of the unmagnetic fraction consisting mainly of the surplus carbon and coal ash to the feed for the rotary kiln, the carbon charged to the rotary kiln is completely utilized in the rotary kiln and a relatively large quantity of solid carbon of low reactivity is introduced into the mixed feed. The presence of said carbon results in a volatilization of a high proportion of the non-ferrous metals or their compounds.

EXAMPLES

The rotary kiln had a length of 12 meters and an inside diameter of 0.8 meters. The kiln was charged with green pellets and solid carbonaceous reducing agent. The green pellet were produced from mixtures of blast furnace mud (A), LD-mud (B), LD-dust (C), mill mud (E), dust mixture from sintering plant and casting bay (F) which had the following properties:

|  | A | B | C | D | E |
|---|---|---|---|---|---|
| chemical analysis | | | | | |
| (% of dry substand) | | | | | |
| Fe$_{ges}$ | 22.90 | 59.70 | 55.00 | 66.20 | 48.10 |
| Fe$_{met}$ | 3.30 | 5.00 | 4.80 | 2.60 | 3.20 |
| C | 19.80 | 0.94 | 0.75 | 5.00 | 1.56 |
| S | 2.40 | | 0.30 | | |
| SiO$_2$ | 4.73 | 0.89 | 1.08 | 1.03 | 5.42 |
| Al$_2$O$_3$ | 2.50 | 0.22 | 0.14 | 0.16 | 1.00 |
| CaO | 3.90 | 6.60 | 8.30 | 1.10 | 8.40 |
| MgO | 0.66 | 0.22 | 0.25 | 0.09 | 0.75 |
| Zn | 13.60 | 3.44 | 1.36 | 0.26 | 0.38 |
| Pb | 7.20 | 0.78 | 0.46 | 0.10 | 3.40 |
| Na$_2$O | 0.12 | 0.23 | 2.80 | 0.05 | 0.94 |
| K$_2$O | 0.47 | 0.13 | 0.77 | 0.08 | 3.40 |
| Mn | 0.38 | 0.88 | 1.10 | 0.28 | 0.60 |
| grain size | | | | | |
| distribution (%) | | | | | |
| +0.500 mm | | | | 8.2 | |
| 0.500–0.315 | | | 2.2 | 6.2 | |
| 0.315–0.200 | 0.2 | 0.6 | 4.0 | 6.8 | 7.6 |
| 0.200–0.125 | 2.0 | 1.2 | 14.8 | 0.6 | 8.4 |
| 0.125–0.090 | 1.6 | 1.6 | 6.8 | 4.2 | 9.6 |
| 0.090–0.063 | 2.8 | 2.8 | 5.4 | 5.0 | 6.2 |
| 0.063–0.045 | 2.4 | 2.4 | 2.6 | 3.8 | 5.6 |
| 0.045–0.032 | 2.2 | 2.4 | 1.8 | 5.2 | 7.2 |
| −0.032 mm | 88.8 | 89.0 | 62.4 | 60.0 | 55.4 |
| (1) moisture (%) | 34.7 | 11.0 | 8.0 | 32.3 | 8.0 |
| (2) basicity $\left(\frac{CaO + MgO}{SiO_2}\right)$ | 0.96 | 7.7 | 7.9 | 1.1 | 1.7 |
| (3) bulkweight (kg/l) | 1.08 | 2.03 | 1.39 | 2.06 | 1.98 |
| (4) specific weight (g/cm$^3$) | 2.80 | 4.22 | 3.76 | 4.67 | 3.66 |
| (5) specific surface (cm$^2$/g) | 23800 | 8270 | 3200 | 5200 | 3000 |

The solid carbonaceous reducing agents had the following properties:

| chemical analysis (% of dry substance) | coke breeze | bituminous coal | briquetted brown coal |
|---|---|---|---|
| C$_{fix}$ | 88.6 | 75.0 | 42.7 |
| volatile condituents | 1.1 | 9.7 | 52.8 |
| ash | 10.3 | 14.4 | 4.5 |
| total sulfur | 0.95 | 1.04 | 0.61 |
| reactivity (cm$^3$CO/g . C . sec) | 0.30 | 0.98 | 10.0 |
| moisture as delivered (%) | 8.3 | 8.5 | 11.0 |
| analysis of ash: 815° C. | | | |
| SiO$_2$ | 42.6 | | 14.5 |
| CaO | 3.9 | | 33.6 |
| MgO | 1.0 | n.d. | 8.2 |
| Al$_2$O$_3$ | 26.4 | n.d. | 6.1 |
| Fe$_2$O$_3$ | 14.6 | n.d. | 16.9 |
| Na$_2$O | 1.6 | 0.0 | 0.22 |
| K$_2$O | 5.1 | 3.2 | 0.14 |
| bulk weight (kg/l) | 0.76 | 0.76 | n.d. |
| grain size distribution (%) | | | |
| +20 mm | — | 14 | |
| 15–20 mm | — | 14.2 | |
| 12–15 mm | — | 12.3 | |
| 10–12 mm | — | 10.2 | 30 × 40 |
| 8–10 mm | 9.4 | 7.5 | |
| 6–8 mm | 12.0 | 5.8 | |
| 3–6 mm | 18.0 | 17.3 | |
| 1–3 mm | 17.8 | 12.9 | |
| −1 mm | 42.8 | 5.8 | |

EXAMPLE 1

The green pellets had the following composition:
53.1% Fe
3.3% C
3.0% Zn
1.8% Pb
0.3% S
basicity 3.0
moisture 11.8%.

The reducing agent consisted of coke breeze and briquetted brown coal which were charged into the kiln in a C$_{fix}$-ratio of 1 to 4.

The pellets were charged into the kiln in an amount of 350 kg per hour. The ratio of C$_{fix}$ to Fe at the charging end of the kiln was 0.60 and in the discharged material 0.20. The solid discharge material was sieved with a parting size of 3 mm. The coarse fraction was 145.5 kg/h and was fed into the electro-slag resistance process. The composition of the coarse fraction was:
75.8% Fe
1.2% C
0.035% Zn
1.22% Pb
metallization 94.4%
unmagnetic portion 3 kg The fine fraction was 82.5 kg/h.

This fraction was subjected to an electro-magnetic separation. The magnetic fraction was 47.5 kg/h and was fed into the electro-slag resistance process. The composition was about the same like the coarse fraction. The unmagnetic fraction was 35 kg/h and contained 77% C$_{fix}$.

From the waste gas there were separated 12 kg/h of oxide containing 35% Zn and Pb.

EXAMPLE 2

The unmagnetic fraction with a grain size below 3 mm of example 1 was recycled to the mixture before pelletizing and incorporated into the green pellets.

The pellets were charged into the accordingly in an amount of 385 kg per hour (11.5% moisture, $C_{fix}$ 11%, Fe 48%). The ratio of $C_{fix}$ to Fe at the charging end of the kiln was held constant at 0.60 by decreasing the amount of charged fresh coal. The ratio in the discharged material was 0.15.

The coarse fraction above 3 mm was 132.6 kg/h with practically no unmagnetic material. The composition of the coarse fraction was:

71.5% Fe
1.8% C
0.015% Zn
0.31% Pb
metallization 97.1%.

The fine fraction was 84.4 kg/h. After electro-magnetic separation the magnetic fraction amounted to 62.4 kg/h with almost the same composition like the coarse fraction. The unmagnetic fraction was 22 kg/h and contained 75% $C_{fix}$.

In practice the recycle of unmagnetic fines into the fed mixture would be regulated such that a balance between obtained unmagnetic fines and recycled fines would be reached.

EXAMPLE 3

Green pellets according to example 1 were fed in an amount of 300 kg/h. The reduction material was a bituminous coal with a grain size between 1 to 10 mm. This coal did not disintegrate to a considerable degree, whereas the coal of examples 1 and 2 disintegrated in the rotary kiln. The ratio of $C_{fix}$ to Fe at the charging end was 0.60.

The solid discharge material was sieved with a parting size of 10 mm. The coarse fraction was 78.9 kg/h. The composition was:

74.9% Fe
1.4% C
0.043% Zn
0.48% Pb
metallization 89.5%
unmagnetic portion 2.1 kg.

The fine fraction was 123.2 kg. After electro-magnetic separation the magnetic fraction amounted to 82.2 kg/h with almost the same composition like the coarse fraction. The unmagnetic fraction was 40 kg/h and contained 71% $C_{fix}$.

EXAMPLE 4

35 kg/h of the unmagnetic fraction below 10 mm of example 3 were ground and then recycled to the mixture before pelletizing and incorporated into the pellets.

$C_{fix}$ to Fe at the charging end of the kiln was held constant at 0.60 by decreasing the amount of charged fresh coal.

The coarse fraction above 10 mm was 94.11 kg/h. The composition was:

71.0% Fe
2.0% C
0.025% Zn
0.19% Pb
metallization 93.8%
unmagnetic portion 0.61 kg The fine fraction was 106.5 kg/h. After electro-magnetic separation the magnetic fraction amounted to 76.5 kg/h with almost the same composition like the coarse fraction. The unmagnetic fraction was 30 kg/h and contained 73% $C_{fix}$.

In practice the recycle of unmagnetic fines into the feed mixture would be regulated such that a balance between obtained unmagnetic fines and recycled fines would be reached.

As can be seen, in case of a coal having a strong disintegration characteristic (examples 1 and 2) the parting size in the sieving step is held low in order to obtain most of the unmagnetic material in the unmagnetic fines fraction, and in case of a coal which has no strong disintegration characteristic (examples 2 and 3) the parting size is held higher in order to obtain the not disintegrated coal particles in the unmagnetic fine fraction. The size of the green pellets was in all examples 10 to 20 mm and less than 50% disintegrated below 10 mm. Therefore it was possible to choose a parting size of 10 mm in examples 3 and 4. If the pellets would have had a stronger disintegration characteristic then the parting size in examples 3 and 4 must have been decreased and a coal with a lesser grain size must have been used. The volatilization of lead and zinc is increased by the recycle of the unmagnetic fines.

What is claimed is:

1. A process for separating non-ferrous metals or compounds thereof from a mixture thereof with ferrous metal or compounds which comprises:
   (a) introducing said mixture after pelletizing or rolling and solid carbonaceous reducing agent into a rotary kiln and thereon volatilizing a substantial portion of the non-ferrous metal content while reducing a substantial portion of the ferrous metal content to sponge iron;
   (b) discharging solids including sponge iron from said rotary kiln and sieving the same with a parting size of about 3 to 10 mm;
   (c) melting the coarse fraction in an electro-slag resistance process;
   (d) subjecting the fine fraction to an electromagnetic separation to obtain a magnetic fraction and an unmagnetic fraction;
   (e) melting the magnetic fraction from step (d) in an electro-slag resistance process, and
   (f) incorporating in and bonding said unmagnetic fraction obtained from step (d) to the feed mixture for said rotary kiln by a rolling or pelletizing operation.

2. A process according to claim 1 wherein the magnetic fraction from step (d) is fed to the electro-slag resistance process of step (c).

3. In a steelmaking process in which materials containing iron oxide are directly reduced and sponge iron is melted by the electro-slag resistance process, the improvement which comprises:
   (a) introducing metallurgical residual materials containing oxides and volatilizable non-ferrous metals or compounds thereof into a rotary kiln, introducing into said rotary kiln solid carbonaceous reducing agents and in said rotary kiln reducing a substantial portion of the iron oxides to sponge iron and volatilizing a substantial portion of the non-ferrous metal content;
   (b) discharging solids including sponge iron from said rotary kiln and sieving the same with a parting size of about 3 to 10 mm, depending upon the feed grading of the residual materials and their disintegration characteristics;

(c) melting the coarse fraction in an electro-slag resistance process;

(d) subjecting the fine fraction to an electromagnetic separation to obtain a magnetic fraction and an unmagnetic fraction;

(e) melting the magnetic fraction obtained from step (d) in an electro-slag resistance process; and (f) rolling or pelletizing the unmagnetic fraction obtained from step (d) with feed fixture whereby the unmagnetic fraction is incorporated in and bonded to the feed mixture.

4. A process according to claim 3, wherein the unmagnetic fraction of step (d) is ground before it is incorporated in and bonded to the feed mixture.

5. A process according to claim 3, wherein the sieving step (b) is carried out at an elevated temperature and the fine fraction is cooled to a temperature below 750° C. before the separating step (d).

6. A process according to claim 3, wherein step (b) is carried out to include more than 80 percent of the unmagnetic material in the fine fraction.

* * * * *